Jan. 30, 1962

G. FRANKLIN 3,018,906

BOAT TRAILER

Filed Dec. 23, 1957

INVENTOR.
Godfrey Franklin
BY
Webster & Webster
ATTYS.

Jan. 30, 1962   G. FRANKLIN   3,018,906
BOAT TRAILER
Filed Dec. 23, 1957   2 Sheets-Sheet 2
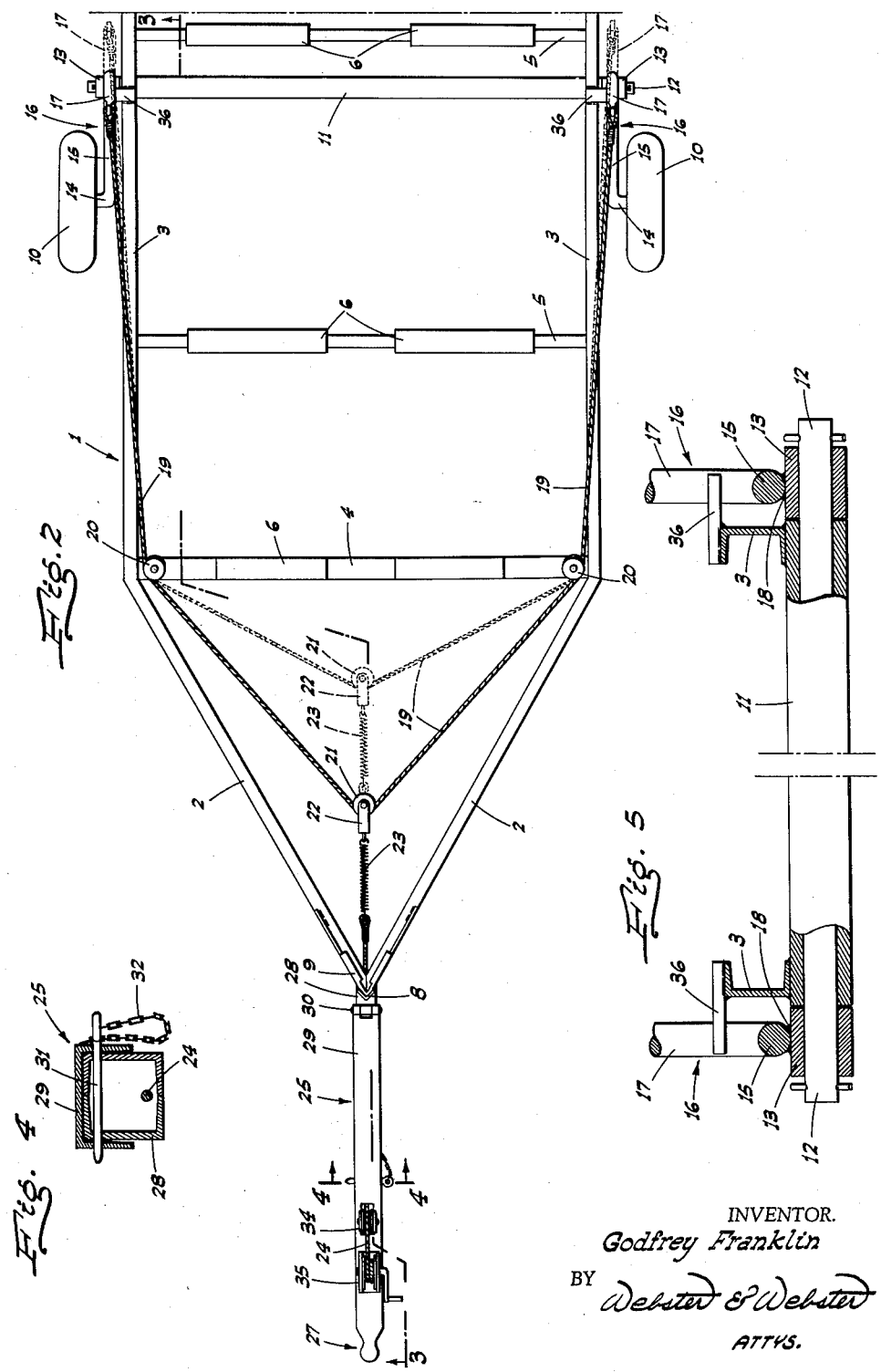
INVENTOR.
Godfrey Franklin
BY Webster & Webster
ATTYS.

3,018,906
BOAT TRAILER
Godfrey Franklin, 2555 2nd Ave., Merced, Calif.
Filed Dec. 23, 1957, Ser. No. 704,659
1 Claim. (Cl. 214—505)

This invention relates in general to an improved load-carrying trailer adapted for connection in draft relation to an automobile or truck; the invention being directed in particular—but not limited—to a trailer adapted to receive and transport a boat.

A major object of the invention is to provide a trailer which includes a boat-carrying frame, supported at the front by a tongue and rearwardly by transversely spaced wheels, which is adapted for adjustment between a normally raised or above-ground transport position, and a lowered position substantially at the ground to facilitate unloading or loading of the boat.

Another important object of the invention is to provide a trailer, as in the preceding paragraph, in which the wheels are mounted for vertical adjustment, and the tongue arranged for vertical articulation, whereby upon relative raising of the wheels and simultaneous downward buckling of the articulated tongue from a normally straight line position, the frame remains substantially parallel to the ground, and lowers thereonto; the vertical adjustment of the wheels and the articulating movement of the tongue being accomplished simultaneously by a novel winch actuated cable system.

A further object of the invention is to provide a trailer which includes a novel mount for each of the transversely spaced wheels.

It is also an object of the invention to provide a trailer which is designed for ease and economy of manufacture, and convenience of use.

Still another object of the invention is to provide a practical, reliable, and durable boat trailer, and one which will be exceedingly effective for the purpose for which it is designed.

These objects are accomplished by means of such structure and relative arrangement of parts as will fully appear by a perusal of the following specification and claim.

In the drawings:

FIG. 2 is a plan view of the same.

FIG. 4 is an enlarged fragmentary transverse vertical section taken on line 4—4 of FIG. 2.

FIG. 5 is an enlarged but foreshortened fragmentary transverse vertical section taken substantially on line 5—5 of FIG. 1.

Figure 1:
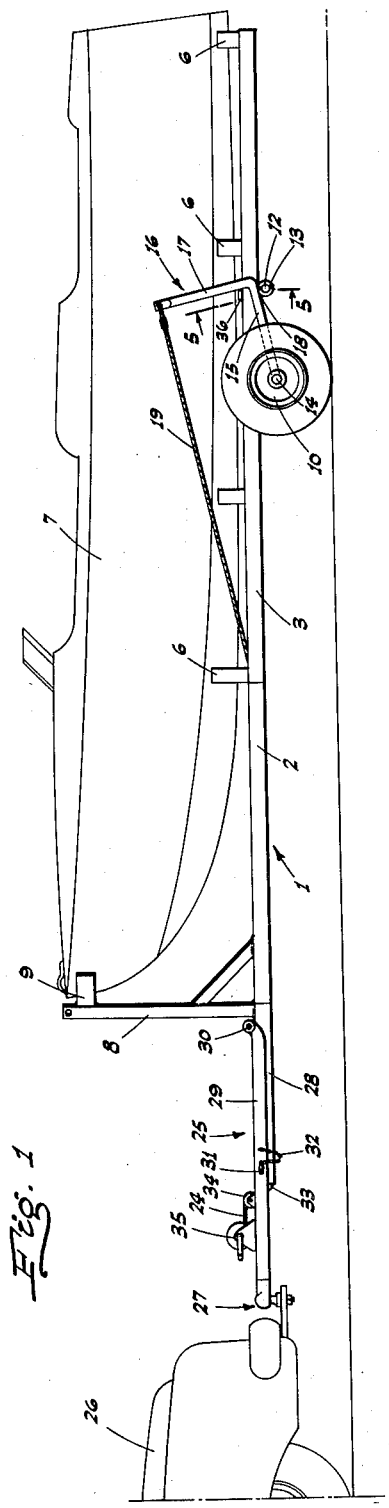
FIG. 1 is a side elevation of the trailer as in use and in transport position.
Figure 3:
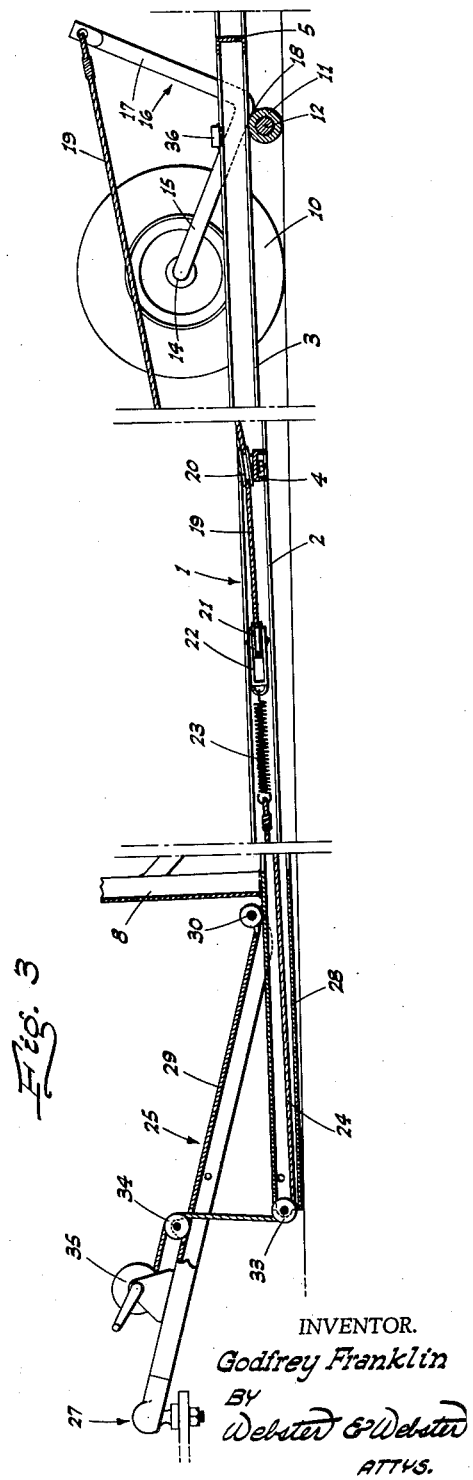
FIG. 3 is a longitudinal foreshortened sectional elevation taken substantially on line 3—3 of FIG. 2, but shows the trailer in lowered position for unloading or loading a boat.

Referring now more particularly to the drawings and to the characters of reference marked thereon, the trailer comprises an elongated frame, indicated generally at 1, and which frame includes convergent forward beams 2 connected together at the apex, and parallel side beams 3 which extend rearwardly from the rear ends of said beams 2. The parallel side beams 3 are secured together in rigid relation by suitable cross beams; the foremost cross beam being indicated at 4, and certain of the intermediate cross beams at 5.

The cross beams 4 and 5 are each formed with a cradle 6; the latter receiving and supporting the boat 7 which is carried and transported by the trailer.

At the forward end of the frame 1 there is an upstanding post 8 formed with a rearwardly opening, V-shaped chock 9 into which the bow of the boat engages; such chock serving to locate the boat lengthwise on the trailer, and which boat is suitably lashed thereto.

Adjacent but short of the rear end of the frame 1 the trailer includes transversely spaced rubber-tired wheels 10 which are disposed laterally out from the corresponding side beam 3 and which are mounted as follows:

A full width tubular cross sleeve 11 spans between and is secured at opposite ends to the side beams 3, with the sleeve initially opening at the ends clear of said beams. A cross shaft 12 is disposed in the sleeve 11 and projects some distance out of the same at opposite ends; the projecting ends of the cross shaft 12 each being fitted with a rotary collar 13. The rotary collars 13 are thus disposed in longitudinal vertical planes adjacent but laterally out from the corresponding side beams 3.

Each wheel 10 is journalled on an axle 14 rigid with the free end of the forwardly projecting arm 15 of a bellcrank lever arm unit, indicated generally at 16, and which unit also includes an upstanding arm 17. Each bellcrank lever arm unit 16 is secured, adjacent the elbow, as by welding 18, to the top of the related collar 13.

As so mounted, the wheels 10 are relatively vertically adjustable upon actuation of the bellcrank lever arm units 16, and which is accomplished through the medium of a novel winch-actuated cable system, comprising the following:

A single length of cable 19 is connected at its ends to the upper ends of the upstanding arms 17 of the bellcrank lever arm units 16, and thence the runs of said cable 19 extend forwardly and turn about corresponding sheaves 20 mounted on opposite ends of the foremost cross beam 4.

From the sheaves 20 the cable 19 converges and turns about the front of a pulley 21. The pulley 21 is journaled in a clevis 22 attached to the rear end of a longitudinal, forwardly extending tension spring 23 fastened to the rear end of a separate cable 24. The separate cable 24 is reeved and actuated in the manner hereinafter described.

At the front thereof—i.e. projecting forwardly from the apex of the convergent forward beams 2—there is a normally straight-line but articulated draft tongue, indicated generally at 25; such draft tongue—at its front end—being coupled to a towing vehicle 26 by a ball and socket type hitch 27.

The articulated draft tongue 25 includes a fixed tongue section 28 which projects forwardly from the front end of the frame 1 and a normally fixed but releasable, vertically swingable tongue section 29 which projects rearwardly from the hitch 27; the rear end of the tongue section 29 being pivoted to a corresponding portion of the tongue section 28 on top thereof, as at 30.

The tongue section 29 is a downwardly opening channel, so that when said sections 28 and 29 are in parallelism the former nests within the latter and is maintained in such position by a removable cross pin 31, whose loss is prevented by a retention chain 32.

When the tongue sections 28 and 29 are nested in parallelesim—and with the cross pin 31 in place—the draft tongue 25 is rigid for normal or transport use of the trailer.

The separate cable 24 leads forwardly from the front end of the tension spring 23 to and about a sheave 33 on the forward end of the fixed tongue section 28, and thence said cable 24 turns and extends upwardly through a suitable opening in the tongue section 29 and passes upwardly and forwardly over a sheave 34 on said latter tongue section.

Ahead of the sheave 34 the cable 24 is connected to a winch 35, preferably of hand-actuated type, but which may be driven by an electric motor, or otherwise.

With the articulated draft tongue 25 locked in its straight-line position by the cross pin 31, and with the cables 24 and 19 pulled forwardly a certain distance by the winch 35, as shown in full lines in FIGS. 1 and 2, the bellcrank lever arm units 16 are swung in a direction such that the arms 17 move forwardly, while the arms 15 move downwardly relative to the frame 1, and which of course disposes said frame in above-ground position for travel of the trailer and transport of the boat 7 thereon.

The extent to which the wheels 10 can be relatively lowered by the winch-actuated cable system is limited by stops 36 secured to the side beams 3 and projecting laterally ouwtardly therefrom in the path of forward swinging movement of the upstanding arms 17.

By reason of the inter-position of the tension spring 23 between the apex or central point of the cable 19 and the separate cable 24, the wheels are permited an upward springing action as the trailer traverses uneven or rough spots in a road.

When it is desired to unload the trailer, and which is usually accomplished by backing it into shallow water—as at a beach or launching ramp—the cross pin 31 is first withdrawn, and then the winch 35 is operated to gradually pay-out the cable 24 (and which permits rearward motion of the cable 19 to the dotted-line position, as in FIG. 2), which allows not only downward buckling of the articulated draft tongue 25, but also relative raising of the wheels 10, so that the frame 1—while remaining substantially parallel thereto—is lowered to the ground.

Upon the frame 1 being so lowered to the ground the boat 7 can be readily unloaded from the trailer, or loaded thereonto, as the case may be.

After the unloading or load operation is conducted the frame 1 is raised to its transport position, including return of the articulated draft tongue 25 to its straight-line position, by the simple expedient of actuating the winch 35 in a reverse direction.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claim.

Having thus described the invention, the following is claimed as new and useful, and upon which Letters Patent are desired:

A trailer comprising a load carrying frame adapted at its forward end for connection to a draft vehicle, a pair of bellcranks disposed in transversely spaced relation, means pivoting the bellcranks on the frame for independent swinging movement, each bell crank including a forwardly projecting arm and an upstanding arm, wheels mounted on the forwardly projecting arm, a winch mounted on the frame ahead of the bellcranks, a cable engaging and projecting rearwardly from the winch, a clevis disposed rearwardly of the cable, a vertical-axis pulley supported in the clevis, another cable engaged about the pulley and extending thence in the form of diverging runs connected at their rear ends to the upstanding bellcrank arms, and a tension spring connecting the clevis and the rear end of the first named cable.

References Cited in the file of this patent
UNITED STATES PATENTS

| | | |
|---|---|---|
| 2,736,568 | Martin | Feb. 28, 1956 |
| 2,793,774 | Lovegreen | May 28, 1957 |
| 2,807,381 | Tegeler | Sept. 24, 1957 |
| 2,953,266 | Anderson | Sept. 20, 1960 |